(12) United States Patent
Peairs et al.

(10) Patent No.: US 7,039,856 B2
(45) Date of Patent: May 2, 2006

(54) AUTOMATIC DOCUMENT CLASSIFICATION USING TEXT AND IMAGES

(75) Inventors: Mark Peairs, Menlo Park, CA (US); Jonathan J. Hull, San Carlos, CA (US); John F. Cullen, Redwood City, CA (US)

(73) Assignee: Ricoh Co., Ltd., Tokyo (JP)

( * ) Notice: Subject to any disclaimer, the term of this patent is extended or adjusted under 35 U.S.C. 154(b) by 226 days.

(21) Appl. No.: 09/163,848

(22) Filed: Sep. 30, 1998

(65) Prior Publication Data

US 2001/0042085 A1 Nov. 15, 2001

(51) Int. Cl.
*G06F 15/00* (2006.01)

(52) U.S. Cl. .................... 715/500; 715/530; 706/15; 706/20

(58) Field of Classification Search ............. 715/500, 715/530, 526, 514, 528–529; 706/15, 20; 707/526, 514, 102, 528–529, 5, 201; 345/624, 345/629

See application file for complete search history.

(56) References Cited

U.S. PATENT DOCUMENTS

| | | | | |
|---|---|---|---|---|
| 5,218,646 A | * | 6/1993 | Sirat et al. ................... 382/158 |
| 5,335,290 A | * | 8/1994 | Cullen et al. ................ 382/176 |
| 5,414,781 A | * | 5/1995 | Spitz et al. .................. 382/296 |
| 5,418,946 A | * | 5/1995 | Mori ............................ 395/600 |
| 5,418,951 A | | 5/1995 | Damashek |
| 5,436,983 A | * | 7/1995 | Bernzott et al. ............. 382/229 |
| 5,463,773 A | * | 10/1995 | Sakakibara et al. .......... 707/102 |
| 5,568,640 A | * | 10/1996 | Nishiyama et al. .......... 707/531 |
| 5,574,802 A | * | 11/1996 | Ozaki .......................... 382/176 |
| 5,642,288 A | | 6/1997 | Leung et al. |
| 5,717,940 A | * | 2/1998 | Peairs ........................... 707/515 |
| 5,767,978 A | * | 6/1998 | Revankar et al. ............ 358/296 |
| 5,784,487 A | * | 7/1998 | Cooperman ................... 707/521 |
| 5,794,236 A | * | 8/1998 | Mehrle ........................... 707/5 |
| 5,805,731 A | * | 9/1998 | Yaeger et al. ................ 382/228 |
| 5,812,995 A | * | 9/1998 | Sasaki et al. ................... 707/1 |
| 5,819,295 A | * | 10/1998 | Nakagawa et al. .......... 707/203 |
| 5,828,771 A | * | 10/1998 | Bloomberg ................... 382/112 |

(Continued)

FOREIGN PATENT DOCUMENTS

JP      07049875 A    *   2/1995

OTHER PUBLICATIONS

Poynder, Web Research Engines?, Information World Review, Dec. 1996, p. 47, 2 pgs.*

(Continued)

*Primary Examiner*—Stephen S. Hong
*Assistant Examiner*—Cong-Lac Huynh
(74) *Attorney, Agent, or Firm*—Blakely, Sokoloff, Taylor & Zafman LLP

(57) ABSTRACT

A method and apparatus for automatic document classification using text and images. The present invention provides a method and apparatus for automatic document classification based on text and image. A new document is analyzed based on textual content as well as visual appearance. The new document is automatically stored in one or more mirror directories in which the new document would most likely be stored by the user of the device if the new document were placed manually. Determination of the most likely directories is based on an analysis of multiple documents stored by the user in various directories. The mirror directories are components of a mirror directory structure, which is a copy of a pre-existing directory structure, such as the user's hard drive. By storing the new document automatically, the user is relieved of the duty of manually selecting a directory for the new document.

31 Claims, 10 Drawing Sheets

U.S. PATENT DOCUMENTS

| | | | | | |
|---|---|---|---|---|---|
| 5,832,470 | A | * | 11/1998 | Morita et al. | 707/1 |
| 5,841,905 | A | * | 11/1998 | Lee | 382/203 |
| 5,845,304 | A | * | 12/1998 | Iijima | 707/530 |
| 5,848,418 | A | * | 12/1998 | de Souza et al. | 707/102 |
| 5,862,259 | A | * | 1/1999 | Bokser et al. | 382/228 |
| 5,889,886 | A | * | 3/1999 | Mahoney | 382/176 |
| 5,909,510 | A | * | 6/1999 | Nakayama | 382/229 |
| 5,918,236 | A | * | 6/1999 | Wical | 715/500 |
| 5,930,788 | A | * | 7/1999 | Wical | 707/5 |
| 5,937,084 | A | * | 8/1999 | Crabtree et al. | 382/137 |
| 5,983,246 | A | * | 11/1999 | Takano | 707/514 |
| 5,987,460 | A | * | 11/1999 | Niwa et al. | 707/6 |
| 5,991,709 | A | * | 11/1999 | Schoen | 704/1 |
| 5,995,651 | A | * | 11/1999 | Gelenbe et al. | 382/156 |
| 5,999,664 | A | * | 12/1999 | Mahoney et al. | 382/305 |
| 6,018,728 | A | * | 1/2000 | Spence et al. | 706/20 |
| 6,081,616 | A | * | 6/2000 | Vaezi et al. | 382/171 |
| 6,094,652 | A | * | 7/2000 | Faisal | 707/5 |
| 6,098,066 | A | * | 8/2000 | Snow et al. | 707/3 |
| 6,104,835 | A | * | 8/2000 | Han | 382/225 |
| 6,137,911 | A | * | 10/2000 | Zhilyaev | 382/225 |
| 6,148,289 | A | * | 11/2000 | Virdy | 705/1 |
| 6,154,737 | A | * | 11/2000 | Inaba et al. | 707/3 |
| 6,185,550 | B1 | * | 2/2001 | Snow et al. | 707/1 |
| 6,192,351 | B1 | * | 2/2001 | Persaud | 706/2 |
| 6,243,501 | B1 | * | 6/2001 | Jamali | 382/305 |
| 6,253,169 | B1 | * | 6/2001 | Apte et al. | 704/9 |
| 6,356,922 | B1 | * | 3/2002 | Schilit et al. | 707/3 |
| 6,363,178 | B1 | * | 3/2002 | Chiba et al. | 358/403 |
| 6,460,034 | B1 | * | 10/2002 | Wical | 707/5 |
| 6,480,627 | B1 | * | 11/2002 | Mathias et al. | 382/224 |

OTHER PUBLICATIONS

Dagan, Automation of Information Access Tasks: Technological Trends and Opportunities, Jun. 1998, vol. 22 p. 75, 4pgs.*

Imade et al., Segmentation and Classification for Mixed Text/Image Documents Using Neural Network, IEEE 1993, pp. 930–934.*

Farkas, Neural Networks and Document Classification, IEEE 1993, Electrical and Computer Engineering, pp. 1–4.*

Farkas, Towards Classifying Full–Text Using Recurrent Neural Networks, IEEE 1995, pp. 511–514/.*

Lln et al., Extracting Classification Knowledge of Internet Documents with Mining Term Association: a Semantic Approach, ACM 1998, pp. 241–249.*

Doyle, Is Automatic Classification a Reasonable Application of Statistical Analysis of Text?, Journal of the Association for Computing Machinery, vol. 12, No. 4, Oct. 1965, pp. 473–489.*

Borko et al., Automatic Document Classification PartII. Additional Experiments, Journal of the Association for Computing Machinery, vol. 11, No. 2, Apr. 1964, pp. 138–151.*

Iwane et al., A Functional Classification Approach to Layout Analysis of Document Images, IEEE Oct. 1993, pp. 778–78.*

Shih et al., A Document Segmentation, Classification and Recognition System, IEEE 1992, pp. 258–267.*

Chakrabarti et al., Scalable Feature Selection, Classification and Signature Generation for Generating Large Text Databases into Hierarchical Topic Taxanomies, VLDB Journal 1998, pp. 163–178.*

Iwane et al., A Functional Classification Approach to Layout Analysis of Document Images, IEEE 1993, pp. 778–781.*

Antonacopoulos et al., Segmentation and Classification of Document Images, 1995, IEEE, pp. 1–7.*

Azokly et al., A Language for Document Generic Layout Description and Its Use for Segmentation into Regions, 1995, IEEE, pp. 1123–1126.*

Jain et al., Page Segmentation Using Document Model, 1997, IEEE, pp. 34–38.*

Shih et al., Adaptive Document Block Segmentation and Classification, Oct. 1996, Systems, Man and Cybernetics, vol. 26, pp. 797–802.*

Tin Ho, et al., "Decision Combination in Multiple Classifer Systems",IEEE Transactions on Pattern Analysis and Machine Intelligence, vol. 16, No. 1, Jan. 1994.

* cited by examiner

US 7,039,856 B2

AUTOMATIC DOCUMENT CLASSIFICATION USING TEXT AND IMAGES

FIELD OF THE INVENTION

The present invention relates to document management. More particularly, the present invention relates to automatic classification of documents using both text and images.

BACKGROUND OF THE INVENTION

Typically, electronic documents are stored in a hierarchical structure of directories/folders during or after creation. For example, when a user creates a document using a word processing application, the user saves the document to a directory or sub-directory of a storage device, such as a hard drive. Similarly, electronic documents that are generated from physical documents, for example, by scanning the physical document are stored by the user generating the new electronic document.

As electronic documents become more prevalent in offices and homes, conversion of documents from physical form to electronic form may become more common. Individual assignment of directories for each document can be time consuming and tedious. Also, as physical documents are manipulated using copiers, facsimile machines and printers, electronic copies may be saved for later retrieval. Individual electronic storage of each physical document that is manipulated can quickly become time consuming.

What is needed is a method and apparatus for automatic classification and storage of electronic documents.

SUMMARY OF THE INVENTION

A method and apparatus for automatic document classification using text and images is described. An original directory structure is analyzed to determine classification characteristics of documents previously stored. In one embodiment, a shadow, or mirror, directory structure is generated based on the original directory structure. Documents are automatically classified and stored based on the characteristics of the original directory structure.

BRIEF DESCRIPTION OF THE DRAWINGS

The present invention is illustrated by way of example, and not by way of limitation, in the figures of the accompanying drawings in which like reference numerals refer to similar elements.

DETAILED DESCRIPTION

Figure 1:
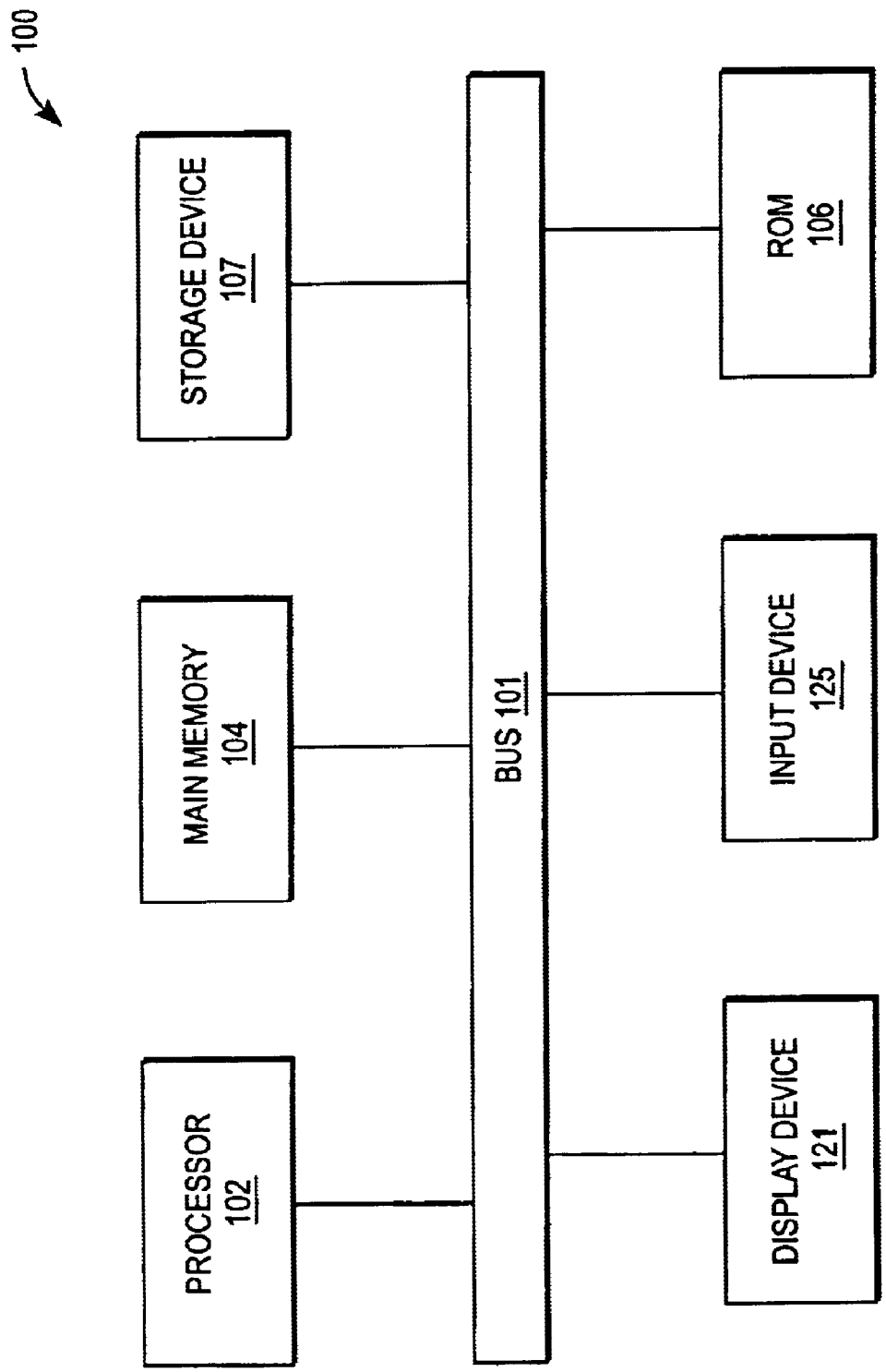
FIG. 1 is one embodiment of a document processing device.

A method and apparatus for automatic document classification using both text and images is described. In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CDROMs, and magneto-optical disks, read-only memories (ROMs), random access memories (RAMs), EPROMs, EEPROMs, magnetic or optical cards, or any type of media suitable for storing electronic instructions, and each coupled to a computer system bus. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Overview

Briefly, a method and apparatus for automatic document classification based on both text and image is described. A document is analyzed based on textual content as well as visual appearance to obtain both a text-based classifier and an image-based classifier, respectively. These classifiers may be used to characterize, or profile, documents.

Based on a document's textual and visual content, the document is automatically stored in the one or more directories (or folders) of a document hierarchy in which the document would most likely be stored by a user if the document were placed there manually by the user. Determination of the most likely directories is based on an analysis of previously stored documents stored by a user in those and other directories. In one embodiment, the directories are components of a mirror directory structure, which is generated by classifying documents in a pre-existing directory structure, such as the user's hard drive. Text-based and image-based classifiers are generated for the documents in the individual directories. These classifiers are combined to obtain to profile describing documents in that directory.

By storing the new document automatically, the user is relieved of the duty of manually selecting a directory for the new document. Also, because the storage location of a document is based on the user's previously created storage arrangement, the user should be able to more easily locate the document.

System Description

FIG. 1 is one embodiment of a document processing device. Document processing device 100 includes bus 101 or other communication device for communicating information, and processor 102 coupled to bus 101 for processing information. Document processing device 100 further includes random access memory (RAM) or other dynamic storage device 104 (referred to as main memory), coupled to bus 101, for storing information and instructions to be executed by processor 102. Main memory 104 also can be used for storing temporary variables or other intermediate information during execution of instructions by processor 102. Document processing device 100 also includes read only memory (ROM) and/or other static storage device 106 coupled to bus 101 for storing static information and instructions for processor 102. Data storage device 107 is coupled to bus 101 for storing information and instructions.

Data storage device 107 such as a magnetic disk or optical disc and corresponding drive can be coupled to document processing device 100. Document processing device 100 can also be coupled via bus 101 to display device 121, such as a liquid crystal display (LCD), for displaying information to a user. Input device 125 allows a user of document processing device 100 to provide input and control. Input device 125 can be, for example, a keyboard, a keypad, a mouse, a trackball, a trackpad, a touch-sensitive screen, etc.

The present invention is related to the use of document processing device 100 to automatically classify documents using both text and images. According to one embodiment, automatic classification is performed by document processing device 100 in response to processor 102 executing sequences of instructions contained in memory 104. Execution of the sequences of instructions contained in memory 104 causes processor 102 to automatically classify documents based on text and images, as will be described hereafter. Instructions are provided to main memory 104 from a storage device, such as magnetic disk, CD-ROM, DVD, via a remote connection (e.g., over a network), etc. In alternative embodiments, hardwired circuitry can be used in place of or in combination with software instructions to implement the present invention. Thus, the present invention is not limited to any specific combination of hardware circuitry and software.

Document processing device 100 can be a computer system in which documents are generated with an application program such as a word processing program, electronic mail program, spreadsheet program etc. Document processing device 100 can also be a copier, facsimile (fax) machine, or printer that stores copies of documents processed. For example, a copier can store images of documents copied. A fax machine can store images of documents sent or received. A printer can store copies of the documents printed.

In one embodiment, document processing device 100 is the ImageHunter™ imaging system available from Ricoh Company, Ltd. of Tokyo, Japan. In such an embodiment, document processing device 100 is an image-based filing system that digitally stores paper documents into electronic format. Conversion of paper documents into filed images, increases accessibility of information compared to manual-based systems such as cabinets, storage boxes, etc.

Figure 2:
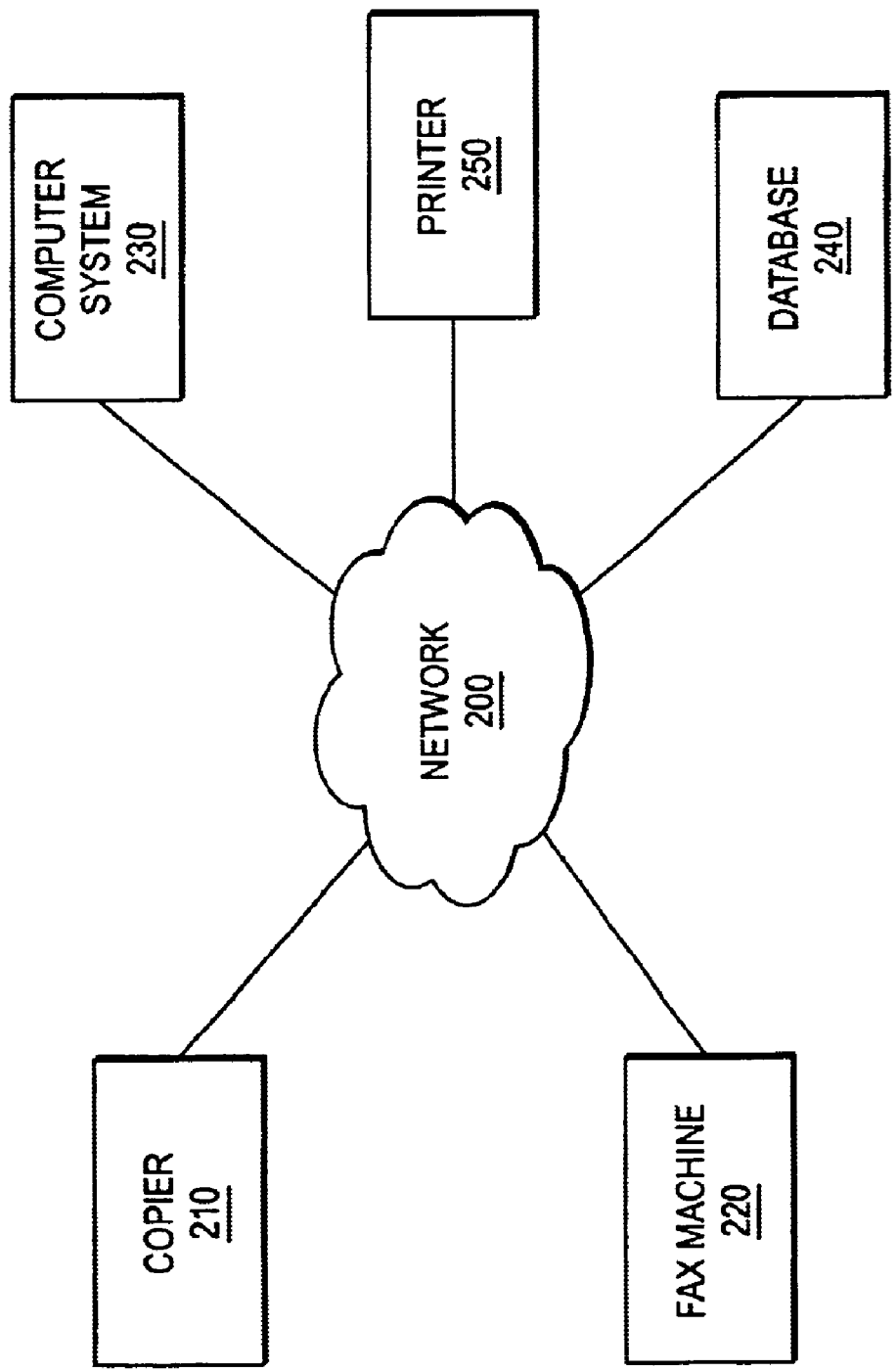
FIG. 2 is one embodiment of a document processing system having multiple document processing devices.

FIG. 2 is one embodiment of a document processing system having multiple document processing devices. The system of FIG. 2 is described in terms of multiple document processing devices interconnected by a network. However, a single such device can provide a document processing system.

In one embodiment, network 200 is a local area network that interconnects multiple document processing and other computing devices. However, other types of networks can be used. For example, network 200 can be the Internet or other wide area network.

Copier 210 is a document copying device that can store documents in database 240 or other storage device, either internal or external to copier 210. Copier 210 is coupled to network 200 to communicate images of documents copied as well as control and other information. Documents can be communicated to other devices coupled to network 200 for further processing or other purposes. In one embodiment, documents copied by copier 210 are stored in database 240 for later retrieval. By storing documents that have been processed the original paper copy of the document is no longer necessary. If the document is needed an electronic version of the document can be retrieved from database 240.

Fax machine 220 is also coupled to network 200. Fax machine 220 stores copies of documents sent and received in database 240 or other storage device, which can be internal or external to fax machine 220. Documents can, for example, be retrieved from database 240 directly and sent via fax machine 220 without the need of a physical document. Similarly, printer 250 can print documents created by devices coupled to network 200 or documents retrieved from database 240 or other storage device.

Computer system 230 can be any type of computer system. In one embodiment, a hard disk (not shown in FIG. 2) of computer system 230 is used to determine the organization of new electronic documents. Because the hard disk of a computer system is organized in a manner that is logical to a user of computer system 230, storage of new electronic documents in the same or similar organization allows new documents to be placed automatically and to be easily retrievable by the user. Automatic organization and storage of new electronic documents is described in greater detail below. Alternatively, a directory structure of database 240 or other storage device can be used to organize documents that are automatically stored.

Printer 250 can be coupled to network 200. Printer 250 can be, for example, a printer that stores data in database 240. Printer 250 provides physical copies of electronic documents and can also store electronic documents on database 240. In one embodiment, a single device provides the functionality of copier 210, fax machine 220 and printer 250.

In order to facilitate the classification scheme for documents as described herein, a document hierarchy is first created which provides a partitioning of the document space based on a user's organization of that space. In one embodiment, this partitioning is accomplished by creating a subdirectory structure that mirrors the directory-based storage memory already in use by an individual. In one embodiment, a system extracts an organization that a user has already applied to files on a computer system.

Figure 3:
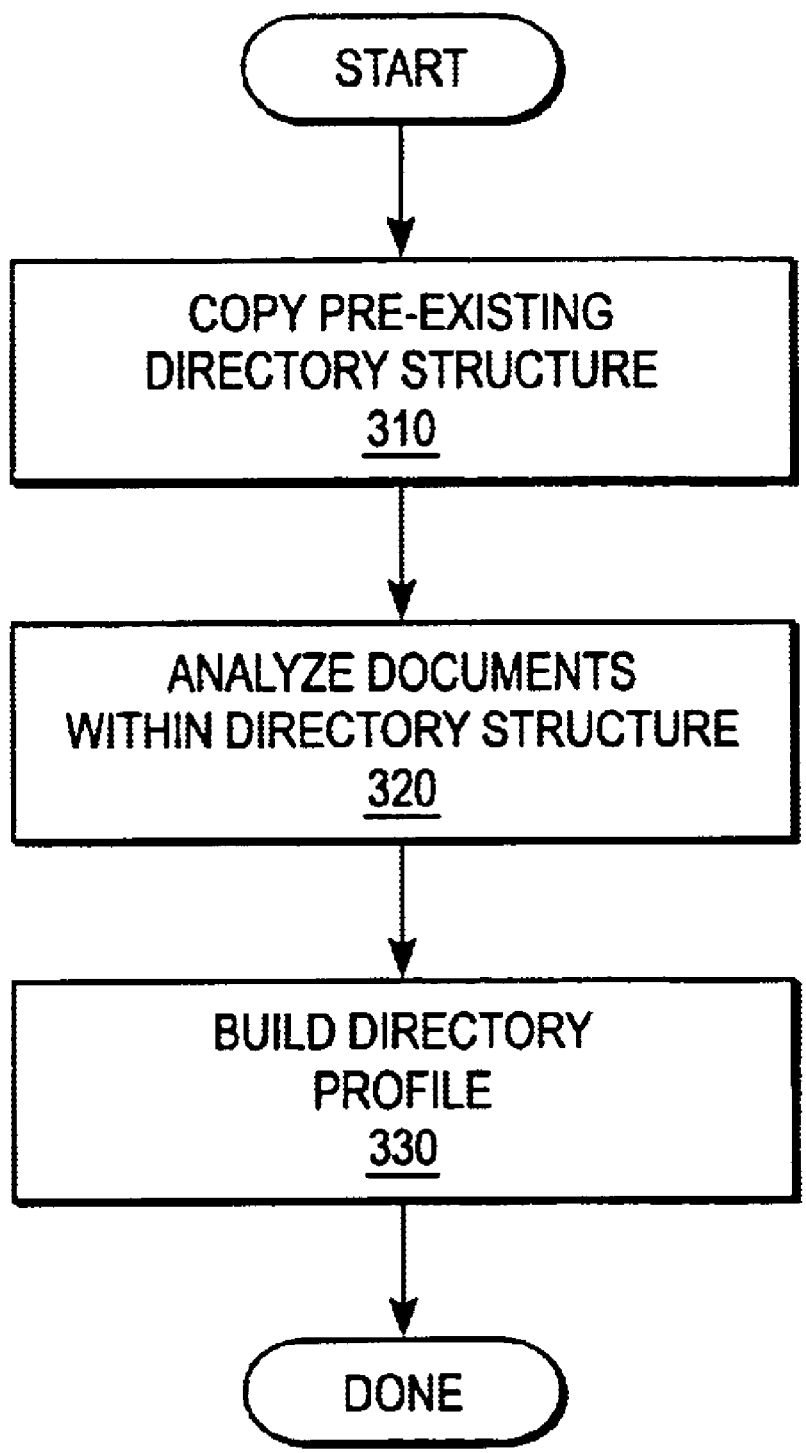
FIG. 3 is one embodiment of a flow diagram of a process for generating a mirror directory structure.

FIG. 3 is one embodiment of a flow diagram of a process for generating a mirror directory structure. As described below, in one embodiment, the present invention analyzes a pre-existing memory hierarchy, such as, for example, a directory structure on user's hard drive. Other preexisting directory structures include Web page bookmarks, document storage directories, etc. and these may also be used to generate the mirror directory structure. The processing of FIG. 3 is performed by processing logic. The processing logic may comprise software running on general purpose or dedicated computer system or machine, or may comprise dedicated hardware, or a combination of both.

Referring to FIG. 3, processing logic initially copies the pre-existing directory structure (processing logic 310). In one embodiment, each directory having anything stored therein such as, for example, files, folders, applications, subdirectories, etc. is copied into a duplicate directory structure having the same directory structure as the original. In one embodiment, the new directory structure may be referred to as the "mirror directory structure" and is a copy of the original directory structure at the time the mirror directory structure is created. In an alternate embodiment, only those portions of the directory with a minimum number of files, folders, applications, etc. are copied. The minimum number may be any number set by user or designer choice, such as, for example, 3, 4, or 5 documents, etc.

In one embodiment, all of the directories (e.g., folders) are located by recursively descending the file system hierarchy. Processing logic creates a list of all of these directories, selects each directory, and examines the files contained in the directory. Processing logic filters files in each of these directories for their content. Files that comprise text, including aschii text, postscript, pdf, etc., are labeled as having text features, while those containing an image, such as those that can be rendered (e.g., postcript, tiff, etc.) are also labeled as having image features. The labeling may be later used to further classify the individual documents, with the directory name labeling the class of documents store therein. The labeling may also be used as an index into a database storing all of the documents. A threshold may be set where a minimum number of document based files must be found before a directory is maintained for a type of document. In this manner, the total number of directories is reduced to a set that contains the documents on the hard drive.

In one embodiment, the process is performed controllably through one or more scripts that filter through the user's hard drive. The process may be capability controlled by the user and is analogous to running a virus checker on the hard drive. The script is run initially when the user starts to build their own hierarchical document database.

Once a mirror hierarchy is generated, the system is trained to recognize the types of documents in each selected directory. Processing logic analyze documents found within the original directory structure (processing block 320). In one embodiment, analysis includes both textual analysis and graphical analysis of documents contained therein. Various embodiments of textual analysis and graphical analysis are described in greater detail below. Textual and graphical analysis are used to characterize the subdirectories within the original directory.

Processing logic then builds a directory profile using the results of the analysis (processing block 330). In one embodiment, a directory profile is built for each subdirectory of the mirror directory structure. The directory profile is used to match new documents with their appropriate storage locations within the mirror directory structure based on the classification of documents already stored in that portion of the directory. Thus, the results of performing textual and graphical analysis on documents in the original directly is to obtain a classifier or classification for each subdirectory. Later, when determining where to store a particular document, the same textual and graphical analysis is applied to that document and the results are compared to the existing classifiers to determine where to store the document.

In one embodiment, the mirror directory structure can be periodically updated based on modifications to the original directory. If a user moves documents between directories in the original directory, the classifiers for directories in the mirror directory may be updated to better reflect the user's new idea of classification. Note that this may be done on a periodic basis or only when an actual change has occurred. Also, all the classifiers may be updated or only those associated with the document(s) moved by the user. The user may perform the update by re-running a script. Therefore, as a user changes the hard drive directory structure, a new structure for the user's documents may be learned by the system.

Figure 4:
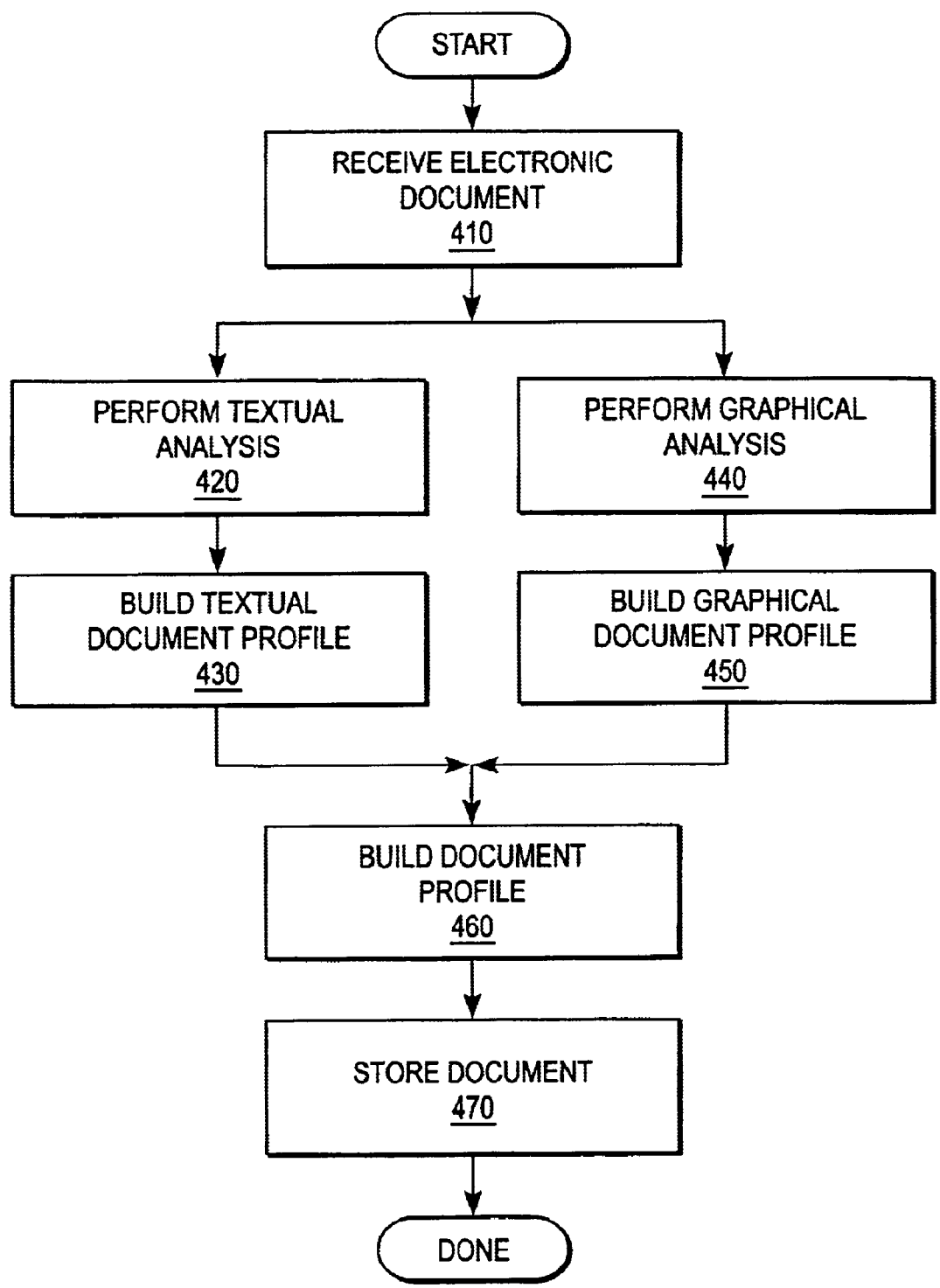
FIG. 4 is one embodiment of a flow diagram of a process for classifying electronic documents.

FIG. 4 is one embodiment of a flow diagram of a process for classifying electronic documents. The classifying of the electronic document allows the document to be stored in a database or other memory transparently to the user. Processing logic, as described above, performs the process. In one embodiment, a script takes the document and runs an auto-filing process where the newly arrived document gets placed in the mirror hierarchy transparently to the user.

Referring to FIG. 4, processing logic receives an electronic document (processing block 410). The electronic document can be received, for example, from a scanner, a copier, a fax machine, a computer system, etc. The electronic document can be a pre-existing electronic document that is to be automatically classified and stored, or the electronic document can be a document that has been recently converted from physical to electronic form, for example, with a scanner. The text of any scanned image may undergo optical character recognition, and both the image data and the text obtained via optical character recognition are saved.

Processing logic performs textual analysis on the electronic document (processing block 420). Textual analysis is described in greater detail below, for example, with respect to FIG. 5. Processing logic uses the results of the textual analysis to build a textual document profile (processing block 430). The textual document profile is a text-based classifier.

In parallel, processing logic performs graphical analysis on the electronic document (processing block 440). Graphical analysis is described in greater detail below, for example, with respect to FIG. 6. Processing logic uses the results of the graphical analysis to build the graphical document profile (processing block 450). The graphical document profile is an imagebased classifier.

In the example of FIG. 4, the textual analysis and graphical analysis are described as being performed in parallel; however, the textual analysis and graphical analysis can be performed in a sequential manner.

Processing logic uses the textual document profile and graphical document profile to build a document profile (processing block 460). In one embodiment, a Borda Count method is used to combine the results of the textual analysis (the text-based classifier) and the graphical analysis (the image-based classifier) to build the document profile. For more information on the Borden Count method, see Tim Ho, et al., "Decision Combination in Multiple Classifier Systems", IEEE Transactions on Pattern Analysis and Machine Intelligence, Vol. 16, No. 1, January 1994.

The Borda Count method assigns points in a descending manner to each choice and then sums the points to determine one or more preferred choices. For example, the directory having the best match based on textual analysis can be assigned three points, the directory having the second best match can be assigned two points, and the directory having the third best match can be assigned one point. Similar assignments are made based on graphical analysis. Of course, points can be assigned in a different manner (e.g., the top five matches, the top seven matches).

The points assigned based on the textual and graphical analysis are combined to determine overall matches. In one embodiment, each electronic document is stored in three directories based on the results of the textual and graphical analysis. Thus, the matches having the three highest totals based on the Borda Count indicate the directories in which the electronic documents are stored. Other techniques for combining the results of the textual analysis and graphical analysis can be used to build the document profile based on both textual analysis and graphical analysis. For example, combining may be done by logistic repression or the highest rank method such as described in Tim Ho, et al., "Decision Combination in Multiple Classifier Systems", IEEE Transactions on Pattern Analysis and Machine Intelligence, Vol. 16, No. 1, January 1994.

The document profile is used to determine where, within the mirror directory structure, the electronic document should be stored. In one embodiment, multiple storage locations are selected based on document profile. Processing logic then stores the document in the one or more locations determined in response to the document profile (processing block 470).

Figure 5:
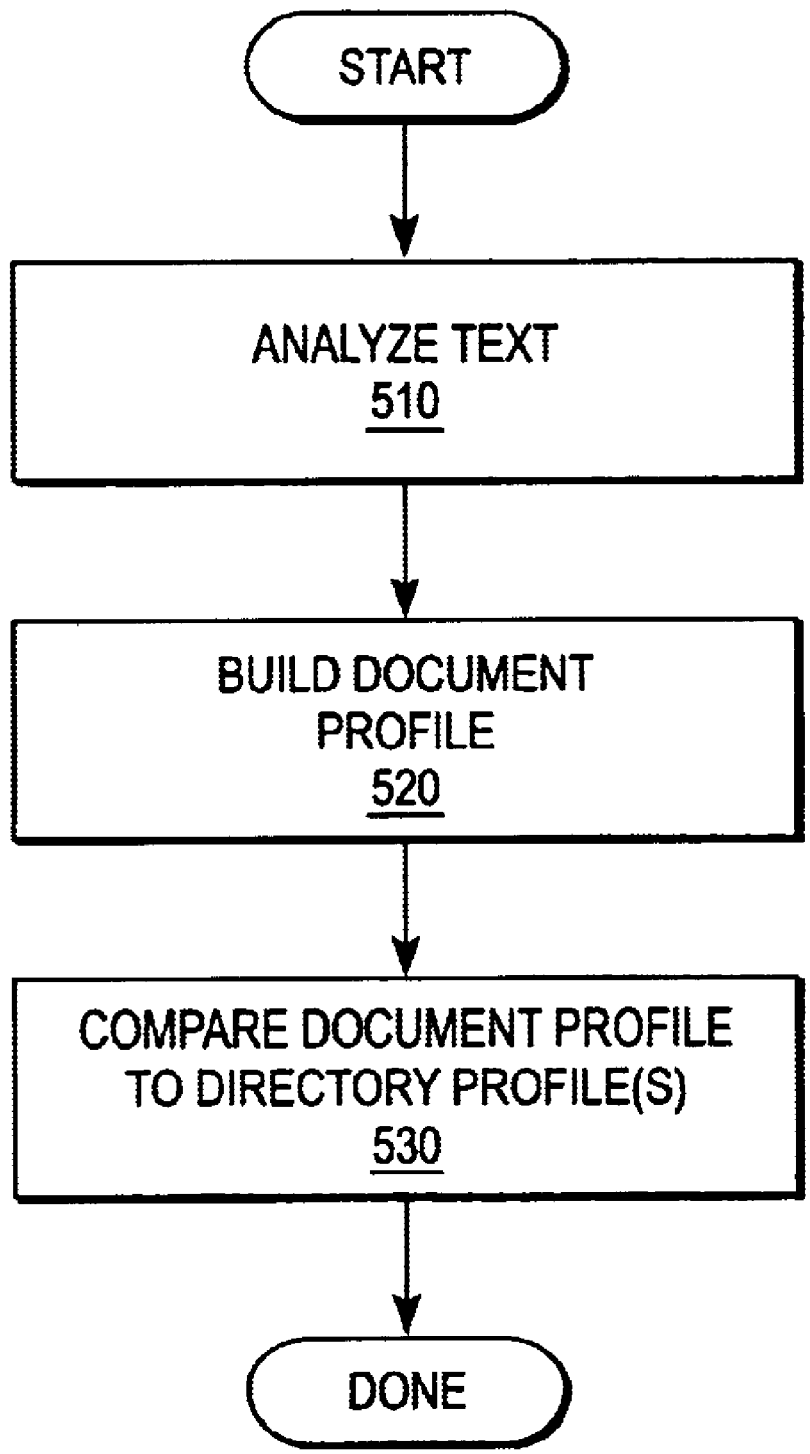
FIG. 5 is one embodiment of a flow diagram of a process for performing textual analysis on an electronic document.

FIG. 5 is one embodiment of a flow diagram of a process for performing textual analysis on an electronic document. The textual analysis can be used both for analysis of the documents in the original directory structure as well as electronic documents to be automatically classified and stored. Processing logic, as described above, performs the process of FIG. 5.

Referring to FIG. 5, processing logic analyzes the text of the electronic document (processing block 510). In one embodiment, this analysis includes extracting the text and processing the text for characteristic words. In one embodiment, stop words (e.g., "a", "the", "but") are removed from extracted text and the remaining words are stemmed. A table is built based on the frequencies of the remaining words. These words are the least frequently used words and the occurrence rate associated with each search word is used as a basis of the document profile.

A second characteristic that can be used to classify electronic documents is the ratio of the number of words in a document to the number of lines in the document. Of course, other types of textual analysis can also be used. Other textual characteristics that may be used in textual analysis include the transition probability of word lengths, such as, for example, the textual analysis described in U.S. Pat. No. 5,909,680, entitled "Document Categorization by Word Length Distribution Analysis," issued Jun. 1, 1999 and character N-gram probabilities such as described in U.S. Pat. No. 5,418,951, entitled "Method of Retrieving Documents that Concern the Same Topic, issued May 23, 1995.

Processing logic builds a document profile based on characteristics determined through the textual analysis (processing block 520). In one embodiment, after the appropriate textual characteristics have been determined, a naive Bayes classifier is used to match the one or more textual characteristics to pre-existing textual characteristics corresponding to directories. One embodiment of a Bayes classifier is described in greater detail in "Machine Learning," McGraw-Hill Companies, Inc., First Edition, 1997. Alternatively, a more sophisticated classifier, such as a neural network, can be used.

Figure 6:
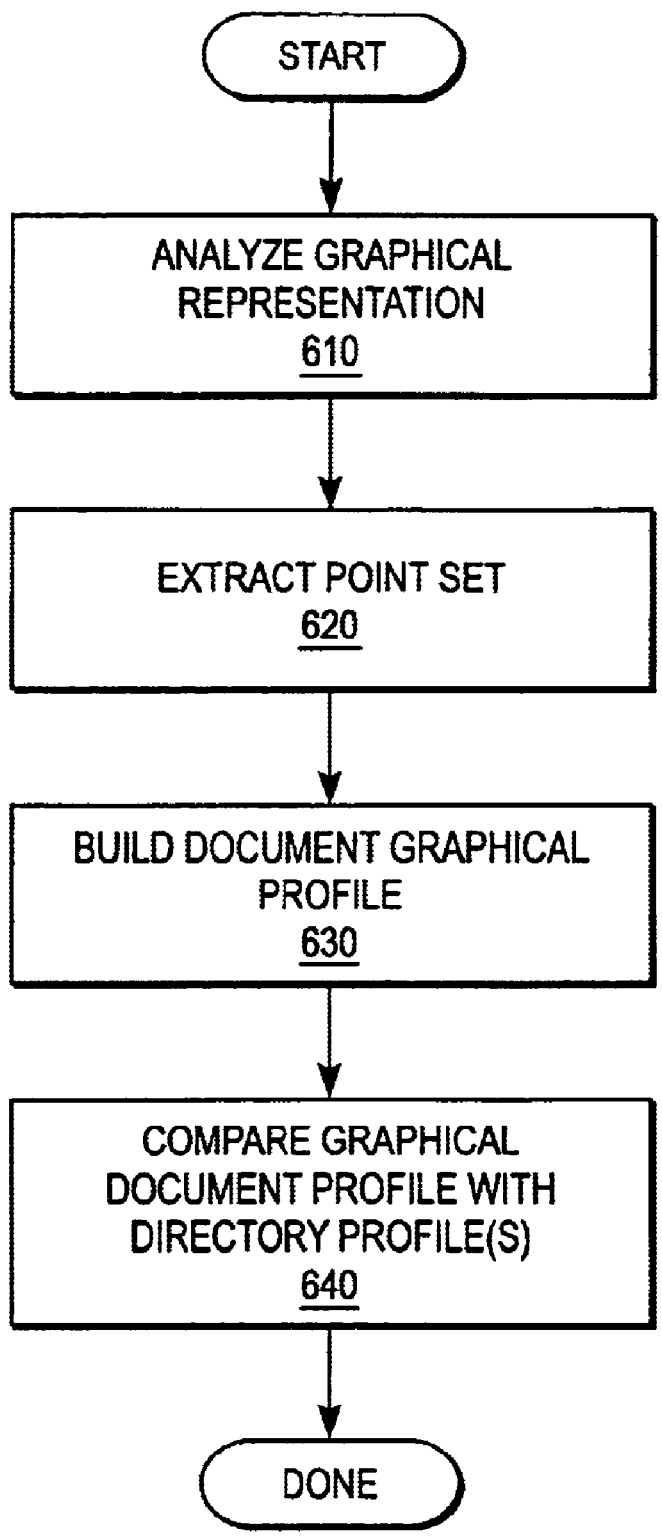
FIG. 6 is one embodiment of a flow diagram of a process for performing graphical analysis on an electronic document.
Figure 7A:
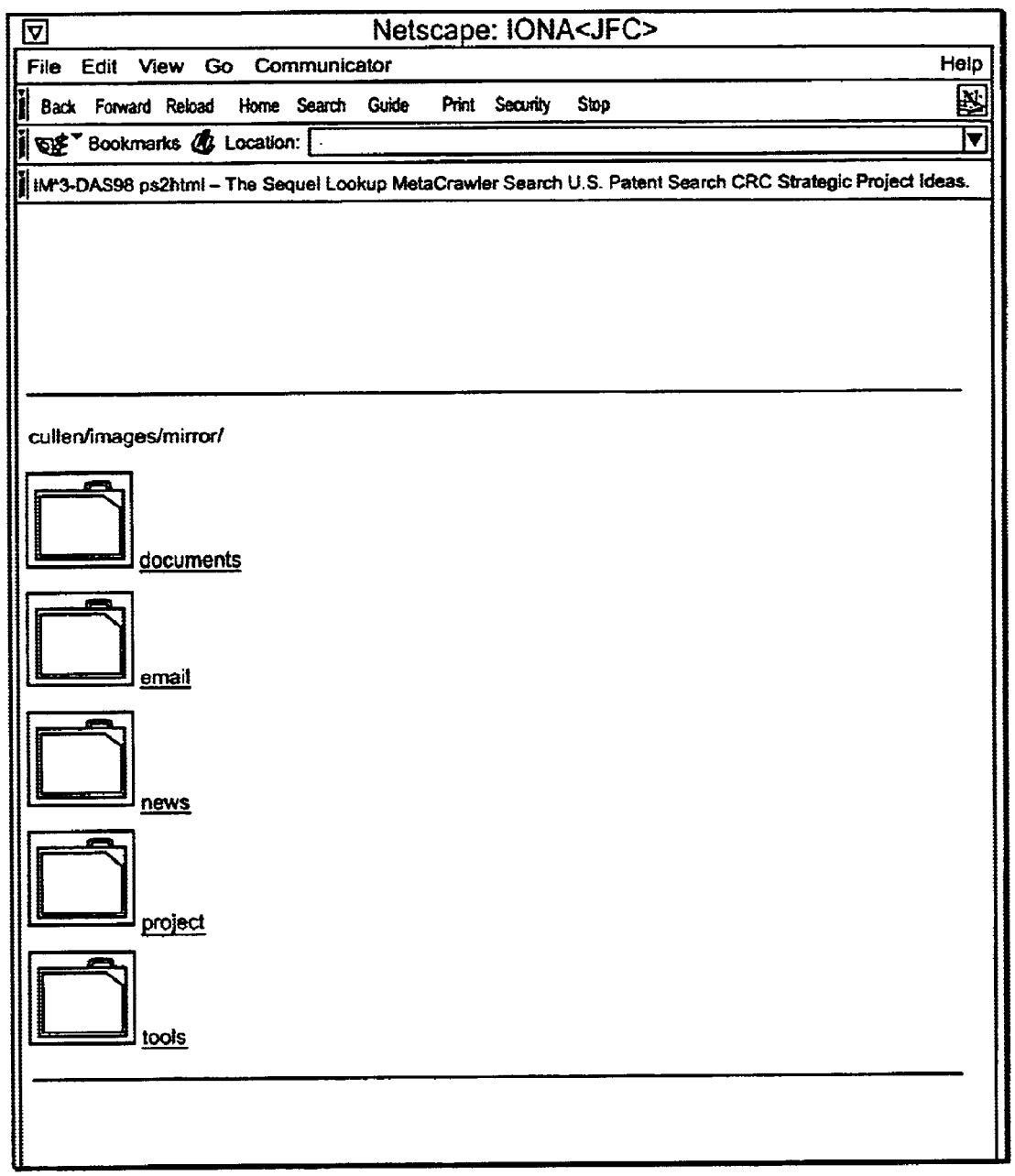
FIGS. 7A–7D illustrate exemplary web pages to traverse a mirror hierarchy.
Figure 7B:
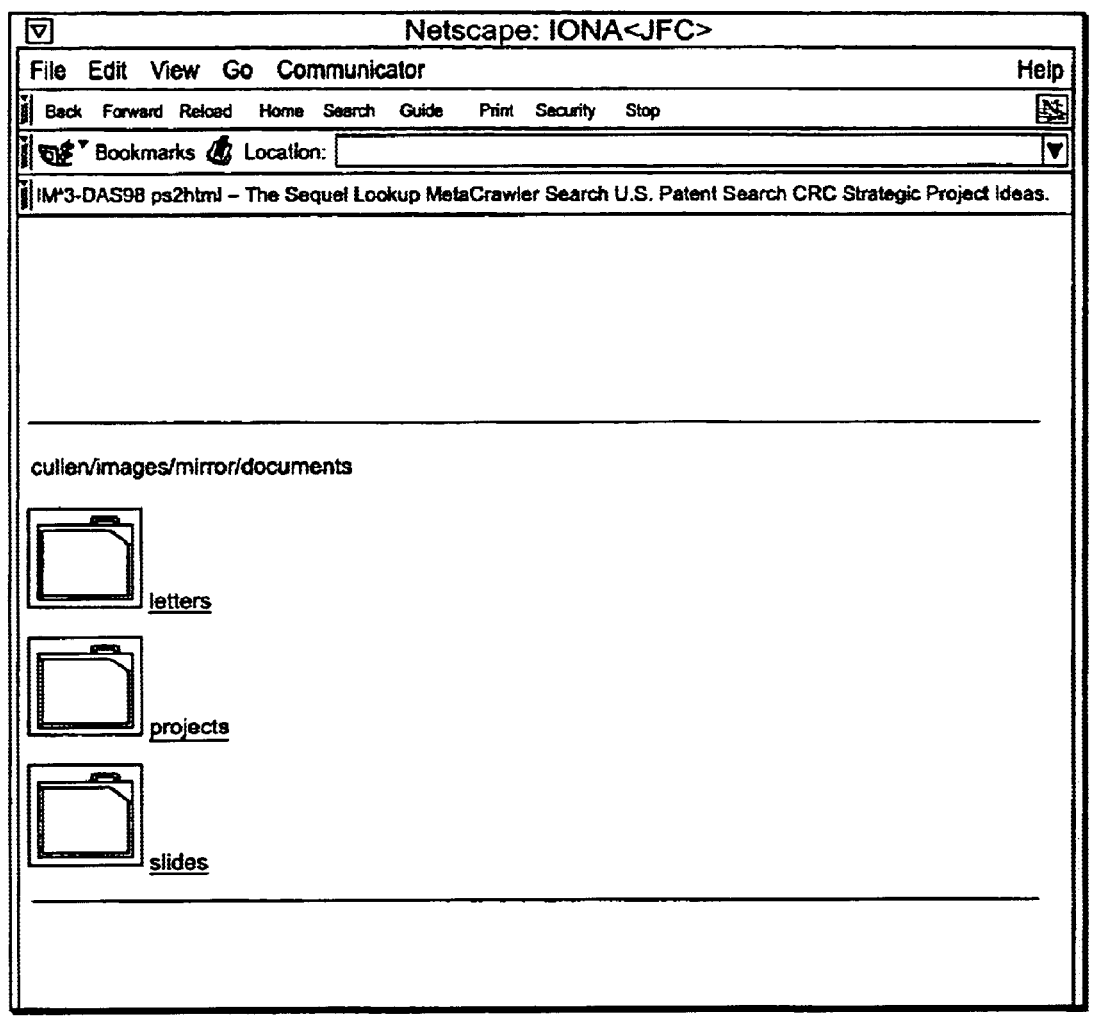
Figure 7C:
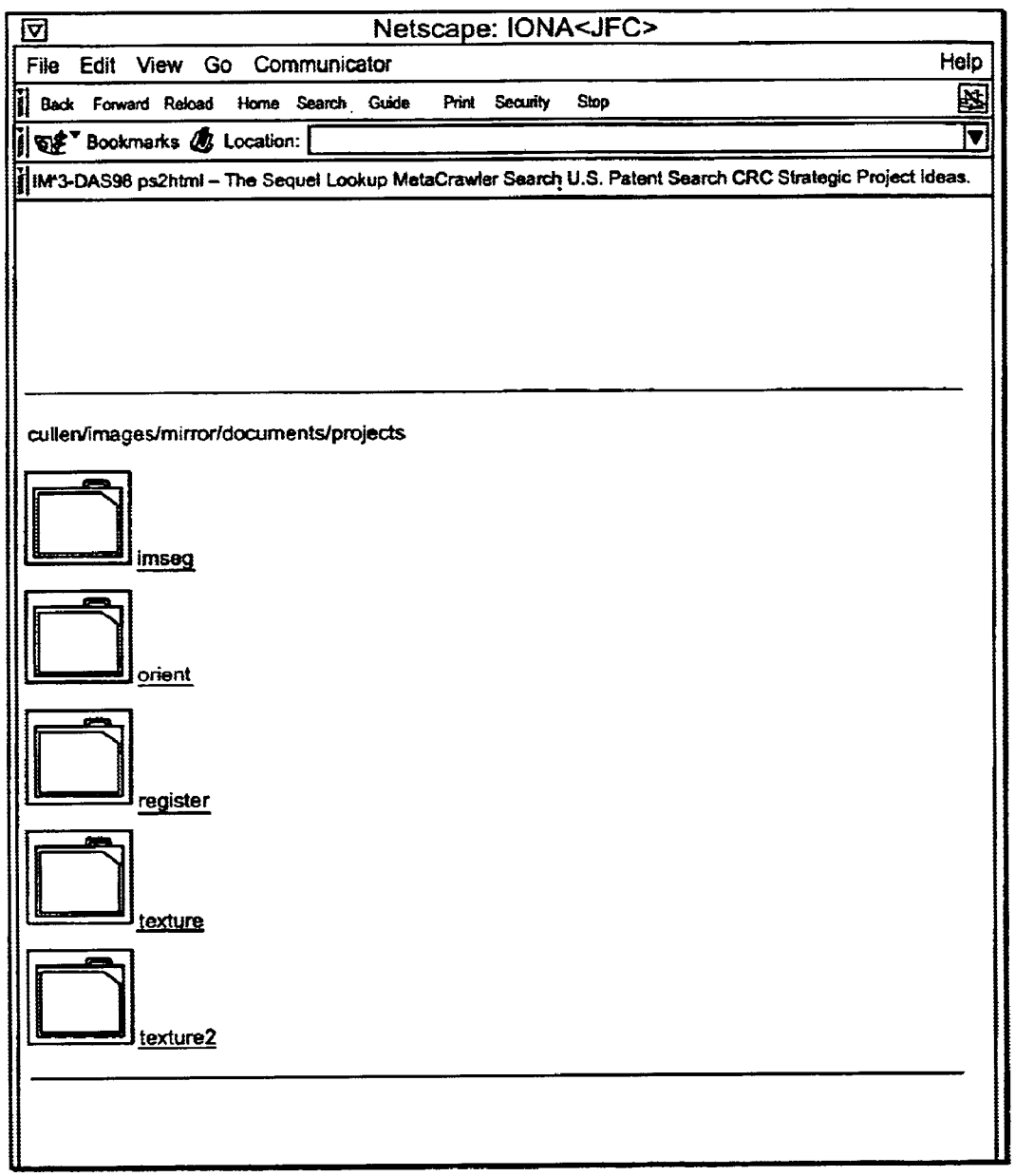
Figure 7D:
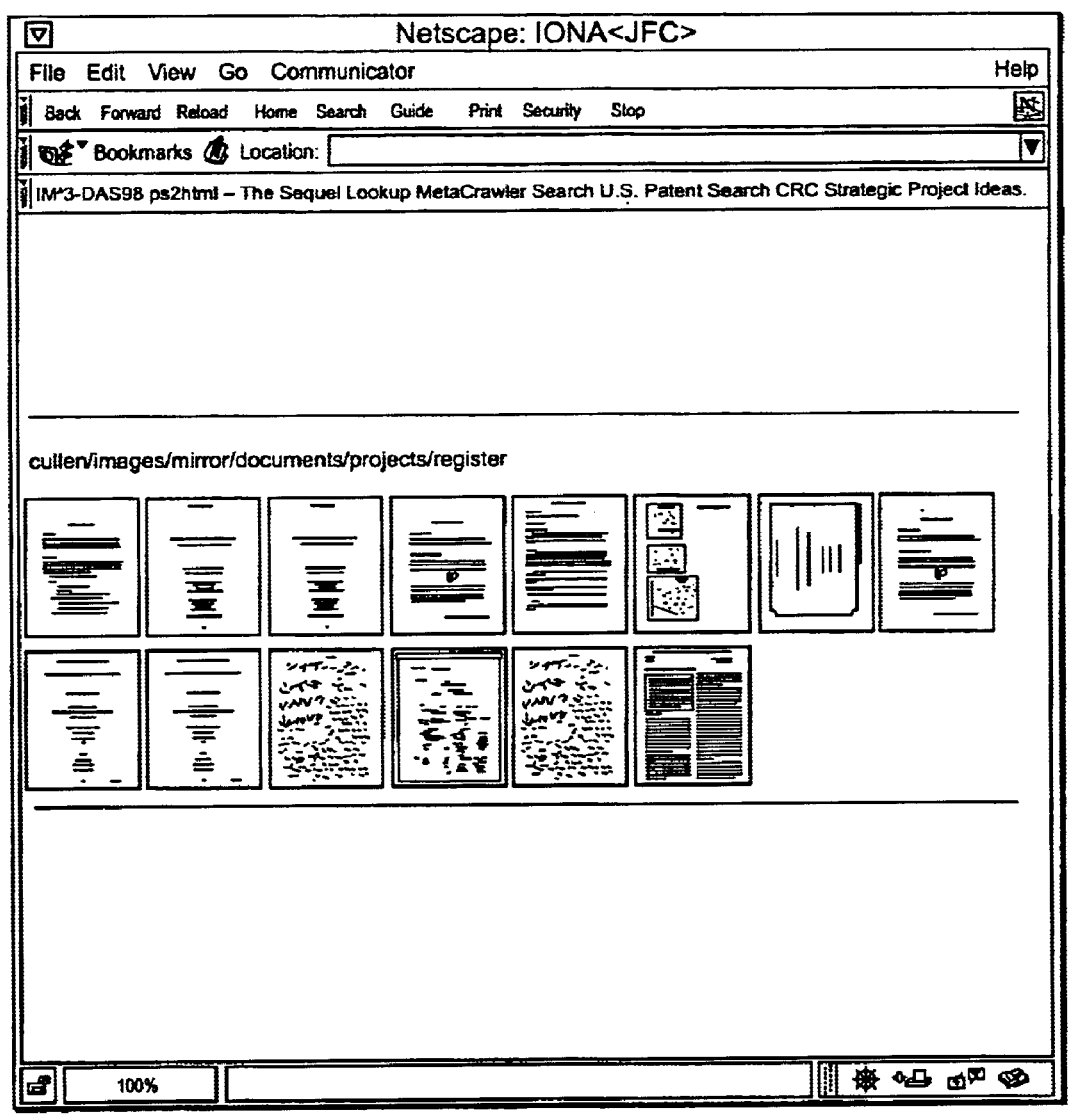

FIG. 6 is one embodiment of a flow diagram of a process for performing graphical analysis on electronic document. The graphical analysis comprises processing the image data for features. As with textual analysis described above, graphical analysis can be used both for analysis of documents in the original directory structure and electronic documents to be automatically classified and stored. Processing logic, as described above, performs the processing shown in FIG. 6.

Processing logic analyzes a graphical representation of the new electronic document (processing block 610). In one embodiment, the analysis includes generating a copy of the electronic document that represents the document as a known graphical format (e.g., PostScript, PDF). Processing logic extracts features. Those features may be based on texture, statistical moments and for distribution of connected components in the document. In alternative embodiments, features may also include one or more of corner points, edges, and line segments. Processing logic then represents the electronic document as a point set (processing block 620), in which a point identifies each intersection of two or more lines. Other graphical representations can also be used. For example, lines as described in a PostScript file can be used.

Processing logic builds a document profile based on the graphical representation of the new document (processing block 630). In one embodiment, the density of points in the point set corresponding to predefined areas of the electronic document is used to build the document profile. Other graphical document profiles can also be built using additional or different graphical representations. The document profile is compared with one or more pre-existing directory profiles to determine one or more locations for the electronic document to be stored.

Using a nearest neighbor classifier, documents that are closest to the document being added are found and a set of candidate labels are assigned. Another approach that may be used is to match the document against the centroids of the previously determined clusters. A "cluster" refers to have a group of documents. Described herein is a topdown method of building clusters in which one document at a time is added to an existing hierarchy.

In a bottom-up cluster building approach, the system is given a set of previously unclassified documents. Feature vectors (containing either image-based or text-based features) are extracted from a document. A standard hierarchical clustering algorithm, such as described in A. K. Jain & R. C. Dubes, "Algorithms for Clustering Data," Prentice Hall, 1988, is applied to the feature vectors. This organizes the documents in a hierarchical tree structure. Terminal nodes in the tree correspond to groups of "similar" documents.

A single centroid vector can be generated for such a cluster in the standard way. Image-based feature vectors are typically of fixed length. A centroid feature vector is generated by adding individual elements from the members of a cluster and dividing by cluster size. Text-based feature vectors, which contain words and their frequencies, are typically of different lengths. The centroid vector is generated in a similar way. It contains a number of elements equal to the total number of unique words in the documents in the cluster.

An unknown document can be matched to such a cluster hierarchy by computing the Euclidean distance between its feature vector and the centroid feature vectors for the terminal nodes in the hierarchy. The unknown document can be added and assigned to the N nodes that minimize the Euclidean distance.

Note that these techniques apply to text as well as graphics.

User interaction may be allowed with the documents in the mirror hierarchy. The user interaction may occur when a document needs to be retrieved. In retrieving a document, the user need only rely on remembering the organization of their hard drive since documents are added to the mirror hierarchy based on the training off the users hard drive.

A web based viewer may be used to traverse the mirror hierarchy. FIGS. 7A–7D illustrate an example set of web pages to navigate from the top level of a hierarchy to a "leaf" node that contains a group of similar documents. These contain both similar images and documents related by their textual content.

In the foregoing specification, the present invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

We claim:

1. A method for document classification comprising:
    using a first directory structure mirroring a second directory structure used by a user for storing documents;
    analyzing content of the documents within the second directory structure to determine a plurality of document classes within the second directory structure, the plurality of document classes indicating a user approach to placing documents in the second directory structure;
    determining a document classification profile associated with the first directory structure based on the plurality of document classes;
    analyzing content of a previously unclassified electronic document to determine a textual profile and a graphical profile of the electronic document;
    generating a classification of the document based on the textual profile and the graphical profile; and
    storing the electronic document in one or more directories within the first directory structure based on the classification of the document and the document classification profile associated with the first directory structure, to resemble the user approach to placing the documents in the second directory structure.

2. The method defined in claim 1 wherein the first directory structure comprises a hierarchy of documents mirroring in a similar fashion an organization in the second directory structure representing a pre-existing memory storing documents.

3. The method defined in claim 2 wherein the pre-existing memory comprises a hard disk.

4. The method of claim 1, wherein analyzing content of an electronic document comprises:
    determining characteristic words of the document;
    determining a frequency for each characteristic word; and
    building a frequency table based on the frequency associated with each characteristic word.

5. The method of claim 1, wherein analyzing content of an electronic document comprises:
    determining a point set corresponding to the electronic document, wherein points of the point set correspond to end points of lines;
    determining a density of points within the point set;
    generating the graphical profile based, at least in part, on the density of points within the point set.

6. The method of claim 1, wherein generating a classification of the document based on the textual profile and the graphical profile comprises combining results from textual and graphical analysis using a Borda Count.

7. The method defined in claim 1 further comprising building the first directory structure by building a hierarchy of documents based on organization of documents stored in a hard drive.

8. The method defined in claim 1 further comprising building the first directory structure by extracting graphical and text features from documents in a directory-based memory to obtain a document classification profile of each subdirectory in the directory-based memory.

9. A software product including a machine-readable medium having stored thereon sequences of instructions, which, when executed by a processor, cause the processor to:
    use a first directory structure mirroring a second directory structure used by a user for storing documents;
    analyze content of the documents within the second directory structure to determine a plurality of document classes within the second directory structure, the plurality of document classes indicating a user approach to placing documents in the second directory structure;
    determine a document classification profile associated with the first directory structure based on the plurality of document classes;
    analyze content of a previously unclassified electronic document to determine a textual profile and a graphical profile of the electronic document;
    generate a classification of the document based on the textual profile and the graphical profile; and
    store the electronic document in one or more directories within the first directory structure based on the classification of the document and the document classification profile associated with the first directory structure, to resemble the user approach to placing the documents in the second directory structure.

10. The machine-readable medium of claim 9, wherein the sequences of instructions that cause the processor to analyze content of an electronic document further comprise sequences of instructions that cause the processor to:
    determine characteristic words of the document;
    determine a frequency for each characteristic word; and
    build a frequency table based on the frequency associated with each characteristic word.

11. The machine-readable medium of claim 9, wherein the sequences of instructions that cause the processor to analyze content of an electronic document further comprise sequences of instructions that cause the processor to:

determine a point set corresponding to the electronic document, wherein points of the point set correspond to end points of lines;

determine a density of points within the point set;

generate the graphical profile based, at least in part, on the density of points within the point set.

12. The machine-readable medium of claim 9, wherein the sequences of instructions that cause the processor to generate a classification of the document based on the textual profile and the graphical profile further comprises sequences of instructions that cause the processor to combine results from textual and graphical analysis using a Borda Count.

13. A method for document classification comprising:

analyzing content of documents within a pre-existing directory structure to determine a plurality of document classes within the pre-existing directory structure, the plurality of document classes indicating a user approach to placing documents in the pre-existing directory structure;

determining a document classification profile of the pre-existing directory structure based on the plurality of document classes;

generating a mirror directory structure based on the pre-existing document directory structure;

receiving a previously unclassified electronic document;

analyzing content of the electronic document to determine a textual profile and a graphical profile of the electronic document; and placing the electronic document at a certain storage location in the mirror directory structure based on the document classification profile of the pre-existing document directory structure, the textual profile of the document, and the graphical profile of the document, to resemble the user approach to placing the documents in the pre-existing directory structure.

14. The method of claim 13, wherein analyzing content of documents within the pre-existing document directory structure further comprises:

recursively descending the pre-existing document directory structure;

generating a list of directories in the pre-existing document directory structure; and examining files in the directories of the pre-existing document directory structure.

15. The method of claim 13 wherein the pre-existing document directory structure is a hard disk directory structure.

16. The method of claim 13 wherein generating a mirror directory structure based on the pre-existing document directory structure comprises generating a document directory structure having a set of directories and relationships equivalent to the pre-existing document directory structure.

17. The method of claim 13 wherein placing the electronic document in the mirror directory structure comprises:

determining a primary directory in the preexisting document directory structure in which the document is to be placed based on the document classification profile of the pre-existing document directory structure; and storing the document in a directory of the mirror directory structure that corresponds to the primary directory in the pre-existing document directory structure.

18. The method of claim 17 further comprising:

determining a secondary directory in the pre-existing document directory in which the document is to be placed based on the document classification profile of the pre-existing document directory structure; and storing the document in a directory of the mirror directory structure that corresponds to the secondary directory in the pre-existing document directory structure.

19. A computer-readable medium having stored thereon sequences of instructions which, when executed by a processor, cause the processor to:

analyze content of documents within a pre-existing directory structure to determine a plurality of document classes within the pre-existing directory structure, the plurality of document classes indicating a user approach to placing documents in the pre-existing directory structure;

determine a document classification profile of the preexisting directory structure based on the plurality of document classes;

generate a mirror directory structure based on the pre-existing document directory structure;

receive a previously unclassified electronic document;

analyze content of the electronic document to determine a textual profile and a graphical profile of the electronic document; and place the electronic document at a certain storage location in the mirror directory structure based on the document classification profile of the pre-existing document directory structure, the textual profile of the document, and the graphical profile of the document, to resemble the user approach to placing the documents in the pre-existing directory structure.

20. The computer-readable medium of claim 19, wherein the sequences of instructions that cause the processor to analyze content of documents within a pre-existing document directory structure further comprise sequences of instructions that cause the processor to:

recursively descending the pre-existing document directory structure;

generating a list of directories in the pre-existing document directory structure; and examining files in the directories of the preexisting document directory structure.

21. The computer-readable medium of claim 19, wherein the sequences of instructions that cause the processor to generate a mirror directory structure further comprise sequences of instructions that cause the processor to generate a document directory structure having a set of directories and relationships equivalent to the pre-existing document directory structure.

22. The computer-readable medium of claim 19, wherein the sequences of instructions that cause the processor to place a document in the mirror directory structure further comprise sequences of instructions that cause the processor to:

determine a primary directory in the pre-existing document directory structure in which the document is to be placed based on the document classification profile of the pre-existing document directory structure; and store the document in a directory of the mirror directory structure that corresponds to the primary directory in the pre-existing document directory structure.

23. The computer-readable medium of claim 22 further comprising sequences of instructions that cause the processor to:

determine a secondary directory in the pre-existing document directory in which the document is to be placed based on the document classification profile of the pre-existing document directory structure; and store the document in a directory of the mirror directory structure that corresponds to the secondary directory in the pre-existing document directory structure.

24. An apparatus comprising:

means for analyzing content of documents within a pre-existing directory structure to determine a plurality of document classes within the pre-existing directory structure, the plurality of document classes indicating a user approach to placing documents in the pre-existing directory structure;

means for determining a document classification profile of the pre-existing directory structure based on the plurality of document classes;

means for generating a mirror directory structure based on the pre-existing document directory structure;

means for receiving a previously unclassified electronic document;

means for analyzing content of the electronic document to determine a textual profile and a graphical profile of the electronic document; and means for placing the electronic document at a certain storage location in the mirror directory structure based on the document classification profile of the pre-existing document directory structure, the textual profile of the document, and the graphical profile of the document, to resemble the user approach to placing the documents in the pre-existing directory structure.

25. The apparatus of claim 24, wherein means for analyzing content of documents within the pre-existing document directory structure further comprises:

means for recursively descending the pre-existing document directory structure;

means for generating a list of directories in the pre-existing document directory structure; and means for examining files in directories of the pre-existing document directory structure.

26. The apparatus of claim 24, wherein means for generating a mirror directory structure comprises means for generating a document directory structure having a set of directories and relationships equivalent to the pre-existing document directory structure.

27. The apparatus of claim 24, wherein means for placing a document in the mirror directory structure comprises:

means for determining a primary directory in the pre-existing document directory structure in which the document is to be placed based on the document classification profile of the pre-existing document directory structure; and means for storing the document in a directory of the mirror directory structure that corresponds to the primary directory in the pre-existing document directory structure.

28. The apparatus of claim 27 further comprising:

means for determining a secondary directory in the pre-existing document directory in which the document is to be placed based on the document classification profile of the pre-existing document directory structure; and means for storing the document in a directory of the mirror directory structure that corresponds to the secondary directory in the pre-existing document directory structure.

29. A document processing system comprising:

a document scanning device;

a document storage device coupled to the document scanning device, wherein the document storage device has a pre-existing document directory structure and a mirror document directory structure organized based on the pre-existing document directory structure; and a processor coupled to the document scanning device and to the document storage device, wherein the processor is to analyze content of documents within the pre-existing document directory structure to determine a plurality of document classes in the pre-existing document directory structure, the plurality of document classes indicating a user approach to placing documents in the pre-existing directory structure, to determine a document classification profile of the pre-existing document directory structure based on the plurality of document classes, to analyze content of a document scanned by the document scanning device, to determine which directory in the mirror document directory structure the scanned document is to be placed based on the analysis of the content of the scanned document and the document classification profile of the pre-existing document directory structure, and to store the scanned document in the determined directory in the mirror document directory structure to resemble the user approach to placing the documents in the pre-existing directory structure.

30. The document processing system of claim 29 wherein the processor is further to determine a secondary directory in the pre-existing document directory structure in which the document is to be placed and to store the document in a corresponding secondary directory in the mirror document directory structure.

31. The document processing system of claim 29 wherein the processor is to analyze content of a document scanned by the document scanning device based on image and textual content of the scanned document.

* * * * *